(No Model.)
F. MERTSHEIMER & S. OTIS.
GREASE AND WATER TRAP FOR AIR BRAKES.
No. 324,575. Patented Aug. 18, 1885.
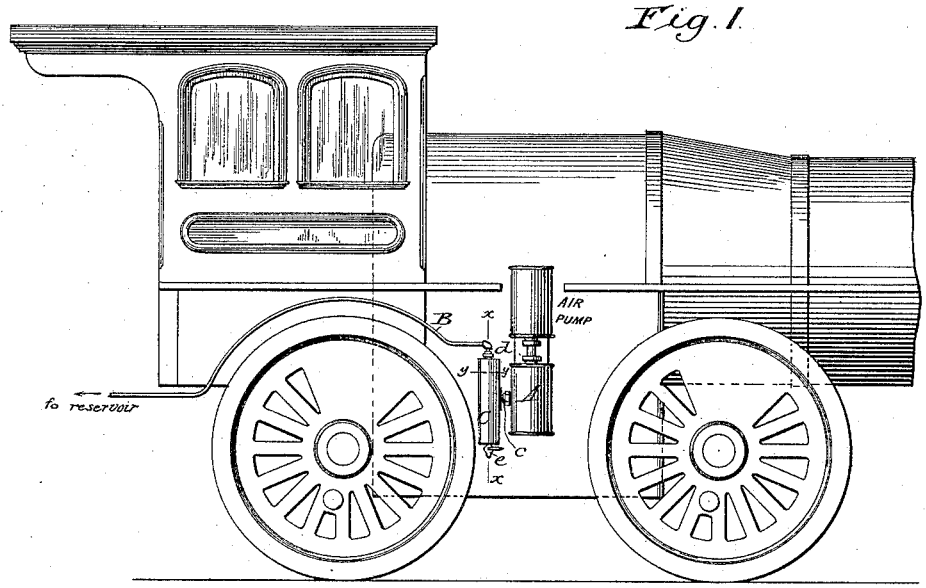
Fig. 1
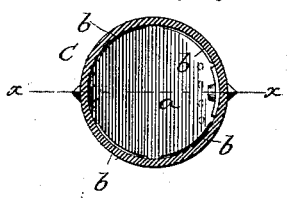
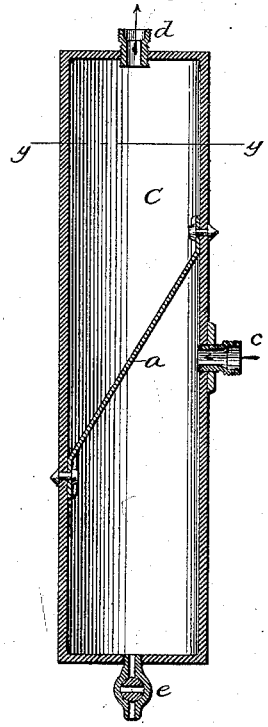
Fig. 2
on line x-x
Fig. 3
on line y-y
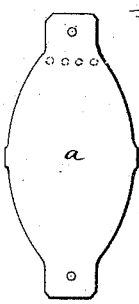
Fig. 4
WITNESSES
Sidney P. Hollingsworth
William H. Shipley
INVENTORS
Frederick Mertsheimer
Spencer Otis
By Phil T. Dodge
Attorney

UNITED STATES PATENT OFFICE.

FREDERICK MERTSHEIMER AND SPENCER OTIS, OF DENVER, COLORADO.

GREASE AND WATER TRAP FOR AIR-BRAKES.

SPECIFICATION forming part of Letters Patent No. 324,575, dated August 18, 1885.

Application filed February 19, 1885. (No model.)

*To all whom it may concern:*

Be it known that we, FREDERICK MERTSHEIMER and SPENCER OTIS, of Denver, in the county of Arapahoe and State of Colorado, have invented certain Improvements in Grease and Water Traps for Air-Brakes, of which the following is a specification.

Our invention relates to a device designed more particularly for use in connection with air-compressing devices employed for operating the brakes on railway-trains, and is designed to arrest and collect all moisture, grease, dirt, and other foreign matters which may pass the pump before the air is delivered into the reservoir; and to this end it consists, mainly, in a chamber or vessel of suitable form, provided with an inclined deflecting-plate, below and against which the air from the pump is delivered, the plate serving to arrest the foreign matters and cause their precipitation, while the purified air ascending through small openings past the deflecting-plate flows to the reservoir.

Our apparatus may be located at any suitable point between the pump and the reservoir, either on the engine, on the tender, or beneath the cars; but it is preferred to mount the same on the locomotive adjacent to the pump, as represented in the accompanying drawings.

Figure 1 represents in outline the rear portion of a locomotive with our device applied thereto. Fig. 2 is a vertical central section of the trap on the line $x\ x$. Fig. 3 is a horizontal section on the line $y\ y$ of Figs. 1 and 2. Fig. 4 is a face view of the deflecting-plate.

Referring to the drawings, A represents the air-compressing pump, which may be of ordinary construction; B, the pipe through which the compressed air is delivered from the pump to the reservoir or other required point, and C the trap, located in the present instance between the delivery-pipe and the pump.

As represented in the drawings, the trap consists merely of an upright cylindrical vessel tightly closed at its two ends, and provided in its interior with a deflecting-plate, $a$, fixed firmly in position therein, midway of the height of the vessel or thereabout. The plate is of such size and form that narrow slits or openings $b$ exist between its edges and the interior of the body to permit the air to ascend past the plate. The delivery-port of the pump communicates with the trap through a pipe, $c$, entering the trap below the plate or diaphragm, as represented in Figs. 1 and 3, so as to direct the inflowing air directly against the under side of the plate. At its upper end the trap has an air-delivery neck $d$, to which the pipe C is connected. At its lower end it is provided with a cock, $e$, through which the accumulated water, grease, and other impurities may be discharged from time to time.

In operation the air is delivered from the pump through the neck $c$ directly against the inclined under surface of the deflecting-plate, which has the effect of arresting and collecting all grease, moisture, and solid matters held in suspension by the air, and causing their precipitation to the bottom of the vessel. The air flows upward past the edges of the plate and escapes at the top. It is manifest that the form of the body of the trap and of the internal plate may be modified to any extent desired, provided they are adapted to operate substantially as herein described.

By the use of our trap we wholly overcome the difficulties and dangers which are experienced at the present day in consequence of oil and moisture being delivered by the air-pump to the brake system, the oil tending to destroy the hose-connections, and, when gummed or thickened, to prevent the ready action of the valves, and the water in cold weather forming ice, which renders the valves wholly inoperative.

While we prefer to have the air ascend past the outer edges of the plate, as described, it is manifest that one or more openings may be made through the plate at suitable points for the passage of the air, care being observed to have the opening or openings in such relation to the inlet-throat that the inflowing air shall not be delivered directly through or to the openings in the plate. The dotted lines in Figs. 2 and 4 represent openings for this purpose.

Having thus described our invention, what we claim is—

1. In an air-brake system for railways, the combination of an air-compressing pump, a conductor through which air is delivered to the brake mechanism, and a trap, substantially such as shown, for collecting grease and moisture, located between the pump and the brake mechanism.

2. In a pneumatic brake system for railways, the air-pump, in combination with the body or vessel C, provided with the deflector-plate with the inlet-opening communicating below said plate, with the delivery portion of the pump, and outlet $d$, located above said plate, whereby the grease and moisture delivered from the pump are arrested and retained.

3. In a pneumatic brake system for railways, and in combination with the air-forcing apparatus, the grease and air trap connected with the delivery-port, said trap consisting of the vessels C, provided with the internal deflector-plate, $a$, the air-inlet $c$, below said plate, the air-outlet $d$, above said plate, and the outlet-cock $e$, located at the bottom.

4. In a grease-trap, the chamber or body provided with the air-inlet midway of its height, with the air-outlet at its top, and with the intermediate plate, $a$, of a width less than the diameter of the vessel, whereby the inflowing air is directed against the under face of the plate and permitted to rise past the edges of the plate to the outlet-port, while the grease and moisture are precipitated.

In testimony whereof we hereunto set our hands this 27th day of January, 1885, in the presence of two attesting witnesses.

FREDERICK MERTSHEIMER.
SPENCER OTIS.

Witnesses:
SCOTT BRYAN,
H. W. POWERS.